United States Patent [19]

Avison et al.

[11] Patent Number: 5,427,899
[45] Date of Patent: Jun. 27, 1995

[54] TWO-PHASE ACIDIC AQUEOUS COMPOSITIONS

[75] Inventors: David W. Avison, Townsend; Agota F. Fehervari, Lexington, both of Mass.; David A. Johnson, Sumter, S.C.; Diana R. Koretsky, Malden, Mass.

[73] Assignee: Polaroid Corporation, Cambridge, Mass.

[21] Appl. No.: 189,105

[22] Filed: Jan. 31, 1994

[51] Int. Cl.⁶ ................ G03C 8/24; G03C 8/52; C08L 33/06
[52] U.S. Cl. .................... 430/454; 430/449; 430/216; 430/627; 523/205; 523/335; 524/560
[58] Field of Search ............ 430/216, 950, 627, 449, 430/454; 524/560; 523/205, 335

[56] References Cited

U.S. PATENT DOCUMENTS

| | | | |
|---|---|---|---|
| 3,756,815 | 9/1973 | Schlein et al. | 430/216 |
| 3,756,816 | 9/1973 | Sullivan | 430/216 |
| 3,785,815 | 1/1974 | Avtges et al. | 430/215 |
| 3,980,602 | 9/1976 | Jakubaukas | 106/308 Q |
| 4,029,504 | 6/1977 | Secrist et al. | 430/216 |
| 4,138,260 | 2/1979 | Krafft et al. | 430/216 |
| 4,243,430 | 1/1981 | Sperry et al. | 524/560 |
| 4,284,708 | 8/1981 | Helling et al. | 430/216 |
| 4,389,479 | 6/1983 | Bishop et al. | 430/216 |
| 4,497,929 | 2/1985 | Brown et al. | 524/547 |
| 4,916,044 | 4/1990 | Tomiyama et al. | 430/216 |
| 4,935,338 | 6/1990 | Masuda et al. | 430/627 |

OTHER PUBLICATIONS

Lambla et al., *Synthesis of Hydrophilic-Lypophilic Copolymers in Emulsion: Initiation of Vinyl Chloride by Aqueous Soluble Polymeric Radicals at the Interface*, A11(8) J. Macromol. Sci.-Chem. 1439–1448 (1977).

Abel, "Neutralizing layer for color transfer assemblage", *Research Disclosure* No. 13525, Jul. 1975, pp. 35–37.

Primary Examiner—Richard L. Schilling
Attorney, Agent, or Firm—Renato M. de Luna

[57] ABSTRACT

A two-phase acidic aqueous composition for use as a neutralization layer is generally comprised of a water soluble aqueous phase and a water insoluble particle phase. The particle phase generally comprises a copolymer having recurring units of an organic acid monomer and an organic ester monomer. The aqueous phase comprises a water soluble polymer having recurring units of at least an organic acid monomer. The organic acid monomers selected for the aqueous phase polymer are capable of interacting with the particle phase polymers such that the particle phase polymers are brought into stabilizing, intimate association with the aqueous phase.

13 Claims, 2 Drawing Sheets

TWO-PHASE ACIDIC AQUEOUS COMPOSITIONS

FIELD OF THE INVENTION

The invention generally relates to a two-phase acidic aqueous polymeric system with a high-acid particle phase, and more particularly, to a two-phase acidic aqueous polymeric acid neutralizing system with a high-acid particle phase, the neutralizing system having acid neutralization capabilities and being suitable for incorporation into diffusion transfer products and processes.

BACKGROUND OF THE INVENTION AND DESCRIPTION OF THE PRIOR ART

Diffusion transfer products and processes have been the subject of several patents, including for example, U.S. Pat. Nos. 2,983,606; 3,345,163; 3,362,819; 3,594,164; and 3,594,165.

In general, diffusion transfer photographic products and processes involve film units having a photosensitive system including at least one silver halide layer, usually integrated with an image-providing material, e.g., an image dye-providing material. After photoexposure, the photosensitive system is developed, generally by uniformly distributing an aqueous alkaline processing composition over the photoexposed element, to establish a diffusible imagewise distribution of the image-providing material. The image-providing material is selectively transferred, at least in part, by diffusion to an image-receiving layer or element positioned in a superposed relationship with the developed photosensitive element, the image-receiving layer being capable of mordanting or otherwise fixing the image-providing material. The image-receiving layer retains the transferred image for viewing, and in some diffusion transfer products, the image is viewed in the image-receiving layer after separation from the photosensitive element (e.g., "peel apart" film units), while in other products, such separation is not required (e.g., "integral" film units).

Image-dye providing materials which may be employed in diffusion transfer processes generally may be characterized as initially soluble or diffusible in the processing composition but selectively rendered nondiffusible in an imagewise pattern as a function of development, or as initially insoluble or nondiffusible in the processing composition but selectively rendered diffusible in an imagewise pattern as a function of development. These materials may contain complete dyes or dye intermediates, e.g., color couplers. A particularly useful class of image-dye providing materials for diffusion transfer processes are dye developers. These compounds contain, in the same molecule, both the chromophoric system of a dye and also a group adapted to develop exposed photographic silver halide.

Although the principles and subject matter presented herein are readily adaptable to other diffusion transfer products and processes, in order to facilitate the presentation herein, representative diffusion transfer products and processes utilizing dye developer image-dye providing materials have been selected to be discussed in more specific detail below.

Multicolor images in a representative diffusion transfer system can be obtained by arranging a photosensitive element with at least two silver halide layers selectively sensitized to different regions of the spectrum. Such a system is shown, for example, in U.S. Pat. No. 2,983,606. To accomplish subtractive color photography, associated with each silver halide layer is a dye developer featuring an absorption that is substantially complementary in color to the color of the light recorded in the contiguous silver halide layer. The most commonly employed arrangement of this type includes three monochrome units—a blue-sensitive silver halide layer overlying a yellow dye developer, a green-sensitive silver halide layer overlying a magenta dye developer, and a red-sensitive silver halide layer overlying a cyan dye developer.

Such an exposed photosensitive element is processed using an aqueous alkaline processing composition containing an alkali, such as potassium hydroxide. The processing composition penetrates the layers of the negative element and dissolves the dye developer compounds by ionizing the developer groups. In each silver halide layer, where the silver halide has been exposed and developed, the dye developer becomes insoluble or at least substantially immobile. In unexposed regions of silver halide, the solubilized dye developer diffuses through the overlying layers to an image-receiving layer to form a positive multicolor image.

The photographic transfer dye image frequently retains substantial amounts of photographic reagent, particularly alkali, with which it has been processed, even though the layer of processing composition is caused to adhere to and remain with the photosensitive layer. The presence of those residual reagents may adversely effect the quality and stability of the image, particularly in the presence of significant quantities of alkali. For example, if the receiving layer is highly alkaline, oxidation by atmospheric oxygen of unreacted developing agent or other component of the processing composition is quite likely to occur, and such reactions or subsequent reactions may impart a stain or otherwise discolor the transfer image, particularly the highlights thereof.

Since the processing compositions employed in diffusion transfer products and processes are highly alkaline (i.e., pH>12), after processing has been allowed to proceed for a predetermined period of time, it is desirable to treat the image-receiving element with a solution which is effective to remove (as by a washing action), neutralize or otherwise render such processing agents relatively innocuous. A neutralizing layer, typically a nondiffusible polymeric acid-reacting agent, has been employed in previous diffusion transfer film units to lower the pH from a first (high) pH of the processing composition to a predetermined second (lower) pH. See e.g., U.S. Pat. No. 3,362,819, issued to E. H. Land on Jan. 9, 1968. In this regard, the polymeric acid, acting as an ion exchanger, forms an immobile polymeric salt with the alkali cation and returns water in place of alkali. Capture of alkali by the polymer molecule prevents deposition of salts on the print surface. The dye developers thus become immobile and inactive as the pH of the system is reduced. As examples of other previously patented neutralizing layers, in addition to those disclosed in the aforementioned U.S. Pat. No. 3,362,819, mention may be made of those disclosed in the following U.S. patents: Bedell U.S. Pat. No. 3,765,885; Sahatjian et al. U.S. Pat. No. 3,819,371; Haas U.S. Pat. No. 3,833,367; Taylor U.S. Pat. No. 3,756,815 and Schlein U.S. Pat. No. 3,756,815.

In Land '819, as with most other previous systems, the polymeric acid neutralization layer was typically deposited onto a dimensionally stable substrate by means of an organic solvent, such as acetone, methyl ethyl ketone, methanol, ethyl acetate, butyl acetate, and mixtures thereof. While organic solvent-based neutralization layers continue to be used, interest has expanded toward the development of an aqueous-based (i.e., water soluble) neutralization layer.

The use of water-soluble ingredients in the neutralizing layer affords several distinct advantages over systems employing water-insoluble solvent-coated components. Apart from the readily apparent advantage in avoiding the use of organic solvents, water-soluble compositions may utilize shorter acid molecules with lower equivalent weights, thereby permitting one to employ thinner coatings. Advantage is gained, since the neutralization layer, in certain diffusion transfer products, should be as thin and clear as possible in order to minimize distortion and/or to obtain the most optimal resolution.

Despite advantage, previous efforts to provide aqueous-based neutralization layers, resulted almost invariably in film units with an unacceptable and unresolvable propensity to curl. See, Schlein '815. Curling was most evident prior to use, making subsequent processing of the film unit for image formation difficult. Curling also manifested in the finished print, which was and continues to be undesirable from an aesthetic standpoint. To the extent that it occurred, gains in the control of curl in aqueous-based systems of previous efforts came at the sacrifice of other aspects of sensitometric performance and/or the unacceptable increase of manufacturing costs.

In view of the above, there has been a long-felt and yet unsatisfactorily resolved need for a composition useful in making a curl-resistant aqueous-based neutralization system having desirable, functional characteristics, such as adequate acid neutralization capabilities, thinness, and clarity. Related need also exists for viable and effective methods for making the compositions used for such neutralization layers.

SUMMARY OF THE INVENTION

Responsive to the aforementioned need for an aqueous neutralizing layer, the present invention provides a two-phase acidic aqueous composition. The two-phase acidic aqueous composition generally comprises a water soluble aqueous phase and a water insoluble particle phase. The particle phase generally comprises a copolymer having recurring units of an organic acid monomer (in a principal embodiment, e.g., acrylic acid) and an organic ester monomer (in a principal embodiment, e.g., butyl acrylate). The aqueous phase comprises a water soluble polymer having recurring units of at least an organic acid monomer. The organic acid monomers selected for the aqueous phase polymer are capable of interacting with the particle phase polymers such that the particle phase polymers are brought into stabilizing, intimate association with the aqueous phase. Properly configured in accordance with the present invention, the composition remains stable with age, and when used in a neutralization layer for diffusion transfer products, promotes heightened resistance to curl.

Several and diverse applications of the composition are envisioned. Use as a neutralization layer for diffusion transfer products is the principal application of the composition. For such products, method aspects of the present invention described herein seek to align the demands of industrial manufacture together with the need to obtain a product with rheological and sensitometric properties most appropriate to its desired end-use. As to the demands of manufacture, chief concerns of design included the reduction of microaggregate and coagulum formation and the reduction of avoidable manufacturing costs.

According to method aspects of the present invention, there is disclosed and described methods of synthesizing the two-phase high-acid aqueous composition of the present invention, the several embodiments of which generally subsist in variations of a polymerization process involving an initial colloidal stabilization step. In one embodiment, colloidally stabilized preparation of a particle phase is followed by "blending" with components of a desired aqueous phase. In another embodiment, the colloidal stabilizer is prepared in situ, followed by a simultaneous polymeric synthesis of both aqueous and particle phases. In a third embodiment, the colloidal stabilizer is again prepared "in situ", but followed by a "step-wise" polymeric synthesis of both aqueous and particle phases.

In light of the above, it is a principal object of the present invention, to provide an acidic aqueous composition that may be incorporated into a diffusion transfer product as a neutralization layer without effecting an undesirable degree of cud.

It is another object of the present invention to provide a stable two-phase acidic aqueous composition having a particle phase and aqueous phase, wherein the particle phase has a comparatively high acid content.

It is another object of the present invention to provide a method for the synthesis of stable two-phase acidic aqueous compositions, the method capable of achieving an effectively reduced formation of microaggregates.

It is another object of the present invention to provide a method for the synthesis of stable two-phase acidic aqueous compositions, the method not requiring use of commercially available polymeric acids.

It is another object of the present invention to provide a comparatively low-cost single reactor method for the synthesis of stable two-phase acidic aqueous compositions, the method capable of achieving an effectively reduced formation of microaggregates.

It is another object of the present invention to provide a comparatively low-cost single-reactor method for the synthesis of stable two-phase acidic aqueous compositions, the method capable of achieving an effectively reduced formation of both microaggregates and coagulum.

For a fuller understanding of the nature and objects of the present invention, reference should be had to the following detailed description taken in connection with the accompanying drawings.

DETAILED DESCRIPTION OF THE INVENTION

Figure 1:
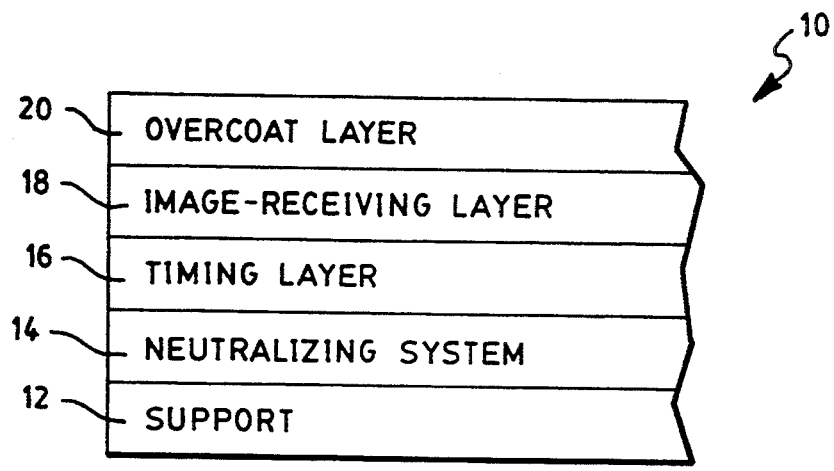
FIG. 1 is a schematic cross-sectional view of an image-receiving element of an embodiment of a photographic application of the invention comprising a support material; a neutralization system according to the present invention, a timing layer, an image-receiving layer and an overcoat layer.

The present invention provides a two-phase acidic aqueous composition that remains stable with age, and when incorporated into, for example, diffusion transfer products, effects good cud performance. The two-phase acidic aqueous composition generally comprises a water soluble phase and a water insoluble particle phase. The particle phase generally comprises a copolymer having recurring units of an organic acid monomer and an organic ester monomer.

The particle phase is comparatively highly acidic (of., "high-acid particle phase"), a condition effected by the comparatively high concentrations of acidic monomers that recur in the particle phase polymer. The concentration of the organic acid monomer utilized for the particle phase polymer of a preferred composition will approximate 20%–30% of the polymer (by weight), with an acceptable range, appropriate for some purposes, as broad as approximately 10% to approximately 40%. The remainder of the particle phase polymer comprises organic ester monomer units. The organic ester monomer components provide the particle phase with "softness", low modulus, low Tg, and promote the insolubility of the particle phase in the aqueous phase. Such functionality is considered in the selection of appropriate organic ester monomers, or equivalents.

The aqueous phase comprises a water soluble polymer having recurring units of at least an organic acid monomer. In certain embodiments, the aqueous phase polymer will be a homopolymer of an organic acid monomer, in other embodiments, it will be a copolymer of an organic acid monomer and an organic ester monomer. Where the aqueous phase is a copolymer, the ratio of the organic acid monomer to the organic ester monomer should be such that the organic acid monomer dominates to a degree wherein the copolymer is operatively water soluble. In a preferred composition, the organic monomer selected for aqueous phase polymer will be the same as the organic ester monomer selected for the particle phase polymer. For embodiments where the aqueous phase is a homopolymer, commercially available linear organic polymeric acids may be utilized.

The organic acid monomers that may be considered for use, alone or in combination, for either the particle phase of the aqueous phase of the present invention include ethylenically unsaturated carboxylic and sulfonic acids which are capable of forming salts with alkali metals or with organic bases, e.g., acrylic acid, 3-butenoic acid, 4-pentenoic acid, 2-hexenoic acid, ethyleneglycolacrylate succinate, ethyleneglycolacrylate phthalate, acrylamidoglycolic acid, 2-acrylamido-2-2-methyl propane sulfonic acid, N-acryloyl-2-methyl alanine, corresponding anhydrides and mixtures thereof. In a preferred composition, described further below, acrylic acid is utilized for the organic acid monomer component of both particle and aqueous phase polymers.

The organic ester monomers that may be considered for use, alone or in combination, for either the particle phase or the aqueous phase of the present invention include vinyl acetate, acrylates and methacrylates. Examples of the acrylates include methyl acrylate, ethyl acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl aerylate, furfuryl acrylate, phenyl aerylate, and the like. Examples of methacrylate include methyl methacrylate, ethyl methacrylate, propyl methacrylate, isopropyl methacrylate, amyl methacrylate, hexyl methacrylate, cyclohexylmethacrylate, benzyl methacrylate, cyanoacetoxyethyl methacrylate, chlorobenzyl methacrylate, octyl methacrylate, N-ethyl-N-phenylamino-ethyl methacrylate, 2-methoxyethyl methacrylate, 2-(3-phenylpropyloxy)ethyl methacrylate, dimethylamino-phenoxyethylmethacrylate, furfuryl methacrylate, phenyl methacrylate, cresyl methacrylate, naphthyl methacrylate, and the like. In a preferred composition, described further below, butyl acrylate is utilized in both particle and aqueous phase polymers. Hydrophobic organic monomers that are capable of producing "rubbery" polymers, such as butadiene and isoprene, may be considered as substantially equivalent substitutes for the organic ester monomers.

In the polymerization of the particle phase, minor amounts of crosslinker may be used, and thereby incorporated into the particle phase. Examples of crosslinkers that may be utilized in the present invention are ethylene glycol diacrylate, ethylene glycol dimethacrylate, butanediol dimethacrylate, methylene-bis-acrylamide, bisphenol A dimethacrylate, bisphenol A diacrylate, pentaerythritol tdacrylate, pentaerythritol tetramethacrylate, pentaerythritol tetraacrylate, glycerol tris(acryloxypropylether), bisacrylamidoacetic acid, allyl acrylate, allyl methacrylate, diallyl phthalate, diallyl maleate, and diallyl fumarate. Whether crosslinker is utilized and in what concentrations will depend on the particular applications of the composition. For diffusion transfer products, the particle phase will comprise crosslinker in amounts generally less than 0.7% Coy weight). In this regard, the insolubility of the particle phase in the aqueous phase will be in greater part afforded by the hydrophobicity provided by the organic ester monomers used for particle phase copolymer and their ratio with the particle phase organic acid monomer. Crosslinking agents may also be considered for crosslinking during coating, examples including butanediol diepoxide, hexamethoxymethylene reelamine, and cyclohexane diol diglycidyl ether.

While the inventors do not wish to be limited to any theory in explanation of the functionality of the compositions of the present invention, it is believed that the unexpected stability of the two-phase acidic aqueous composition is effected by the comparatively high concentration of organic acid monomer units in the particle phase copolymer. The acid constituents of the high-acid particle phase are able to intimately associate with the acid components of the aqueous phase polymers at an "aqueous/particle phase interface". In this regard, it is believed that predominantly acidic blocks of the particle phase copolymer outwardly radiate from the particle phase, or alternatively, that the particle phase is formed with a comparatively acid-rich periphery effectuating good compatibility with the aqueous phase polymers. In either case, the particle phase is "anchored" within the continuous aqueous matrix. When incorporated into a diffusion transfer product as a neutralization layer, indication of the high-acid particle phase and the condition of "intimate association" existing in the composition may be visualized (or otherwise detected) as a discrete component having a "fuzzy", irregular, or variegated periphery. Acid partitioning tests may be used to confirm the composition of the particle phase.

When incorporated into diffusion transfer products, the compositional configuration resulting from the high-acid particles are also believed to account for the improved cuff performance. The configuration provides a more efficient stress dispersing (energy dissipating) mechanism between the aqueous and particle phases, effectively reducing the dry flow properties effecting cuff in conventional aqueous-based film.

In a preferred composition according to the present invention, both aqueous and particle phases of the composition comprise copolymers of recurring units of acrylic acid and butyl acrylate. In the preferred composition, the ratio of total acrylic acid (AA) to total butyl acrylate (BuA) is approximately 50:50. The particle phase copolymer, comprising approximately ⅔ of total polymer, has the polymeric molecular formula —(CH$_2$CHCOOH)$_x$—(CH$_2$CH-COOCH$_2$CH$_2$CH$_2$CH$_3$)$_y$, wherein X is approximately 30% Coy weight) and Y is approximately 70% Coy weight). The aqueous phase copolymer, comprising approximately ⅓ of total polymer, has the same polymeric molecular formula, but wherein X is approximately 90% (by weight) and Y is approximately 10% Coy weight). It will be appreciated that the AA:BuA ratios are approximate and should not be construed narrowly, but with reference to the totality of the description herein. Variations in compositions synthesized under different methods are to be expected. Reference may be made to Table 1A, infra, for representative examples of 50:50 AA:BuA two-phase compositions.

While the 50:50 AA:BuA two-phase compositions are preferred, other operative two-phase compositions have been synthesized having different total AA:BuA ratios. Table 1B, infra, presents representative examples of several 60:40 AA:BuA two-phase compositions. Table 1C, infra, present several representative examples of two-phase compositions with AA:BuA ratios ranging from 20:80 to 40:60. In accord with the present invention, it will be appreciated (from observation of the data presented in each Table) that each two-phase composition may be characterized by its high-acid particle phase and by its organic acid containing aqueous phase. With regard to applications for diffusion transfer products, curl data for representative examples of two-phase compositions are provided in Table 2, infra.

The polymers of the instant invention may be prepared, for example, by known emulsion polymerization techniques. Such techniques and materials such as initiators, emulsifiers, etc., are disclosed in several accessible references, such as W. R. Sorenson and T. W. Campbell, *Preparative Methods of Polymer Chemistry*, 2nd Ed., NY, NY, Wiley (1968), and M. P. Stevens, *Polymer Chemistry—An Introduction*, Addison Wesley Publishing Co., Reading, Mass. (1975).

For diffusion transfer products or like applications, conventional syntheses are, under certain conditions, difficult to implement on a practical industrial scale due to the formation of "microaggregates" often accompanying certain syntheses of the two-phase acidic aqueous composition. Microaggregates are formed by the aggregation of unstabilized polymeric particles of the particle phase. The formation of microaggregates is especially pronounced in emulsion polymerization methods involving the simultaneous synthesis of both particle and aqueous phases. It is believed that during simultaneous synthesis procedures, the relatively high amounts of aqueous polymer formed continuously during synthesis act as flocculants that destabilize the polymeric particles. Formation of high-levels of microaggregates, complicates and increases the costs of manufacture, by forcing additional microaggregate extraction steps, such as filtration or centrifugation. Failure to remove large microaggregates will complicate, frustrate, or otherwise foul the deposition (e.g., coating) of the composition as a layer in a diffusion transfer product.

Accordingly, when a neutralization layer for a diffusion transfer product is the desired application of the two-phase high-acid aqueous composition, manufacture is preferably accomplished through an inventive process wherein a colloidal stabilizer is utilized in an initial step as a means to reduce the formation of microaggregates by stabilizing the particles of the particle phase throughout their synthesis. Several embodiments of the process are provided herein.

In a first embodiment of the inventive method, a process is provided involving the polymerization of high-acid particles in a colloidal stabilizer. The high-acid particle phase is subsequently "blended" with an aqueous linear homopolymeric acid to form the aqueous phase. Colloidal stabilizers that may be used in this embodiment are linear, preferably partially-neutralized, polymeric acids, including commercially-available, linear, partially-neutralized polymeric acids. For most purposes, the suggested colloidal stabilizer is ISX 1690, a linear poly(acrylic acid) marketed by BF Goodrich having a molecular weight (weight average) of approximately 60,000. With regard to the aqueous phase homopolymeric acid, a linear polymeric acid may be utilized. The suggested linear polymeric acid is Goodrite K702, a linear poly(acrylic acid) marketed by BF Goodrich having a molecular weight (weight average) of approximately 240,000 and having sufficient NaOH added to neutralize approximately 2% of the carboxyl groups. It will be appreciated that the linear polymeric acid of the aqueous phase should generally have a higher molecular weight average than the linear polymeric acid utilized as the colloidal stabilizer. Although in certain embodiments K702 may be utilized for the colloidal stabilizer, for diffusion transfer product applications, under certain conditions, K702 usage results in more microaggregate formation than ISX 1690. Synthesis of the high-acid particle phase is accomplished by means of a monomer feed having organic acid monomers and organic ester monomers in concentrations appropriate for formation of the desired high-acid particle phase, together with minor concentrations of a crosslinker. Copolymerization is initiated by the use of initiators such as potassium persulfate and ammonium persulfate, the latter being preferred. Reference is made to Example 1-6, infra, for representative examples of this "blending" process.

In a second embodiment of the inventive method, a process is provided involving polymerization of the colloidal stabilizer "in situ" from organic acid monomers, followed by a simultaneous synthesis of the particle and aqueous phase polymers. While microaggregate formation is higher than the aforementioned "blending" process, advantage is gained by the use of a single reactor and the removal of any reliance on commercial sources of polymeric components. Simultaneous synthesis is accomplished by means of a single monomer feed having organic acid monomers and organic ester monomers in concentrations appropriate for formation of the desired two-phase acidic aqueous composition together with the optional use of minor concentrations of a crosslinker to control gross coagulum formation. It will be appreciated that surfactants may be used together with the monomer feed charge to reduce microaggregate levels. Copolymerization is initiated by the use of initiators such as potassium persulfate and ammonium persulfate, the latter being preferred. Reference is made to Example 7-9, 14, infra, for representative examples of this method of "in-situ synthesis".

In a third embodiment of the inventive method, a process is provided involving the polymerization of the colloidal stabilizer "in situ" from organic acid monomers, followed by a step-wise synthesis of the particle phase and aqueous phase polymers. The "step-wise" synthesis of the third embodiment involves two-monomer feeds. The first monomer feed is designed to form the particle phase and follows in essence the particle phase synthesis of the "blending" process. The second monomer feed is designed to form the aqueous phase, and generally involves having organic acid monomers in concentrations suitable for formation of the desired two-phase acidic aqueous composition, with consideration of the concentrations used for the preceding particle phase synthesis. Reference is made to Example 10, infra, for a representative example of this "multi-staged, continuous synthesis".

In the third embodiment, while capable of producing a two-phase acidic aqueous composition virtually without formation of microaggregates, "coagulum" was formed under certain handling conditions. In contrast to microaggregates, it is believed that formation of such coagulum (which has a skin-like appearance) results from an excess of polymer in combination with foaming during fluid handling. Skin-like coagulum is generally undesirable for compositions used as neutralization layers for diffusion transfer products. To prevent the formation of skin-like coagulum without increasing microaggregate formation, the third embodiment (i.e., the "multi-staged continuous synthesis") may be modified by extending the duration of the second monomer feed. In this regard, the second monomer feed of the "unextended" embodiment will generally proceed for under an hour. In contrast, in the "extended" embodiment, the second monomer feed is prolonged for several hours. Under one theory, basis for the reduced formation of skin-like coagulum has been tied to decreasing molecular weight trends observed in longer monomer feeds. Reference is made to Examples 11-13, infra, for representative examples of this "extended, multi-staged continuous synthesis".

Regardless of the method utilized, two-phase acidic aqueous compositions are especially well suited for incorporation into diffusion transfer products as a neutralization layer. As to this application, Table 3, infra, provides post-process pH results of several two-phase acidic aqueous composition samples.

The neutralization layers comprising the two-phase acidic aqueous compositions of this invention can be incorporated into diffusion transfer products, for example, in image-receiving elements designed to receive and mordant image dye-providing materials. Such image-receiving elements (described in further detail below) will generally comprise a suitable support carrying a neutralization layer of this invention and may also include an image-receiving layer comprising any variety of mordant species or mixture thereof. In this regard, various polymeric materials have been utilized as mordants in photographic products and processes including those of the diffusion transfer type. Thus, polymeric mordants suited to application in diffusion transfer products and processes for the formation of photographic images in dye are described, for example, in U.S. Pat. Nos. 3,148,061 (issued Sep. 8, 1964 to H. C. Haas); 3,758,445 (issued Sep. 11, 1973 to H. L. Cohen et al.); 3,770,439 (issued Nov. 6, 1973 to L. D. Taylor); 3,898,088 (issued Aug. 5, 1975 to H. L. Cohen, et al.); 4,080,346 (issued Mar. 31, 1978 to S. F. Bedell); 4,308,335 (issued Dec. 29, 1981 to T. Yamamoto, et al.); 4,322,489 (issued to E. H. Land, et al.) and 4,563,411 (issued Jan. 7, 1986 to I. Y. Bronstein-Bonte), and 4,794,067 (issued Dec. 27, 1988 to J. M. Grashoff, et al.).

Referring to FIG. 1, there is shown an image-receiving element 10 comprising support material 12, a neutralizing system 14 incorporating a two-phase acidic aqueous composition according to the present invention, a timing layer 16, an image-receiving layer 18, and an overcoat layer 20. Support material 12 can comprise any variety of materials capable of carrying neutralizing system 14 and the other layers as shown in FIG. 1. Paper, vinyl chloride polymers, polyamides such as nylon, polyesters such as polyethylene glycol terephthalate or cellulosic derivatives such as cellulose acetate or cellulose acetate-butyrate can be suitably employed. It will be appreciated that depending upon the particular application intended for image-receiving element 10, the nature of support material 12 as a transparent, opaque or translucent material will be a matter of choice.

As indicated previously, support 12 of image-receiving element or article 10 can be transparent, opaque or translucent depending upon the particular application of the element or article. Thus, where image-receiving element 10 is desirably utilized in the manufacture of photographic diffusion transfer film units such as shown generally in FIGS. 2 and 3 hereof, where the desired image will be viewed through a support, support 12 will be of transparent material. A preferred material for this purpose is a polyethylene glycol terephthalate sheetlike support material. Alternatively, where image-receiving element 10 is utilized in the manufacture of a photographic film unit such as is generally shown in FIG. 4, where the desired image will be viewed as a reflection against a light-reflecting layer, support material 12 will preferably be of opaque material.

In FIG. 1 is shown overcoat layer 20 which comprises an optional layer of image-receiving element 10. Image-receiving layer 18 can, thus, comprise the outermost layer of image-receiving element 10. In some instances, it may be desirable to provide image-receiving layer 18 with a washing treatment, as by washing the layer with ammonia or a solution of ammonium hydroxide in a concentration, preferably of from about 2% to about 8% by weight. Such ammonia washing treatment effectively neutralizes residual acrolein/formaldehyde condensate where such material is utilized for the hardening of the image-receiving layer and for the provision of reduced water sensitivity. According to one embodiment of the invention, overcoat layer 20 can comprise a polymeric material such as polyvinyl alcohol.

Overcoat layer 20 can also be utilized as a means of facilitating separation of image-receiving element 10 from a photosensitive element. Thus, where the image-receiving element is utilized in a photographic film unit which is processed by distribution of an aqueous alkaline processing composition between the image-receiving element and a photoexposed photosensitive element and is adapted, after formation of a dye image, to separation from the developed photosensitive element and the processing composition, overcoat layer 20 can effectively function as a "strip coat".

A suitable "strip coat" can be prepared from a hydrophilic colloid material such as gum arabic or the like. For example, overcoat 20 can comprise a solution of hydrophilic colloid and ammonia and can be coated from an aqueous coating solution prepared by diluting concentrated ammonium hydroxide (about 28.7% NH$_3$) with water to the desired concentration, preferably from about 2% to about 8% by weight, and then adding to this solution an aqueous hydrophilic colloid solution having a total solids concentration in the range of about 1% to about 5% by weight. The coating solution also preferably may include a small amount of surfactant, for example, less than 0.10% by weight of Triton X-100 (Rohm and Haas Co., Phila., Pa.). A preferred solution comprises about 3 parts by weight of ammonium hydroxide and about 2 parts by weight of gum arabic.

Overcoat 20 can also be used as a means of decolorizing optical filter agent typically employed in a photographic processing composition. A polymeric layer 20 is provided over image-receiving layer 18 of an image-receiving element intended for use in a film unit of the integral negative-positive type, described in detail hereinafter. The decolorizing overcoat layer 20 serves to increase the apparent whiteness of the layer of processing composition providing the background against which the image is viewed. Suitable polymeric decolorizing materials for use as layer 20 are described in U.S. Pat. Nos. 4,298,674 (issued Nov. 3, 1911 to E. H. Land, et al.); 4,294,907 (issued Oct. 13, 1981 to I. Y. Bronstein-Bonte, et al.); 4,367,277 (issued Jan. 4, 1983 to C. K. Chiklis, et al.), and U.S. Pat. No. 4,777,112 (issued Oct. 11, 1988 to G. S. La Pointe, et al.).

The image-receiving layers incorporating the neutralizing systems according to the present invention find applicability in a number of photographic diffusion transfer products and processes. According to one embodiment of the present invention, the image-receiving layers of the invention are utilized in photographic film units adapted to the provision of photographs comprising the developed silver halide emulsion(s) retained as part of a permanent laminate, with the desired image being viewed through a transparent support against a reflecting background. In such photographs, the image-carrying layer is not separated from the developed silver halide emulsion(s). Diffusion transfer photographic products providing an image viewable without separation against a reflecting background in such a laminate have been referred to in the art as "integral negative-positive film units".

Integral negative-positive film units of a first type are described, for example, in the above noted U.S. Pat. No. 3,415,644 and include appropriate photosensitive layer(s) and image dye-providing materials carded on an opaque support, an image-receiving layer carded on a transparent support and means for distributing a processing composition between the elements of the film unit. Photoexposure is made through the transparent support carrying polymeric acid-reacting layer, a timing layer and the image receiving-layer of the invention. A processing composition containing a reflecting pigment is distributed between the image-receiving and photosensitive components. After distribution of the processing composition and before processing is complete, the film unit can be, and usually is, transported into light. Accordingly, in integral negative-positive film units of this type, the layer provided by distributing the reflecting pigment provides a reflecting background for viewing through the transparent support the image transferred to the image-receiving layer.

Integral negative-positive film units of a second type are described, for example, in U.S. Pat. No. 3,594,165, include a transparent support, carrying the appropriate photosensitive layers and associated image dye-providing materials, a permeable opaque layer, a permeable and preformed light-reflecting layer, and means for distributing a processing composition between the photosensitive layer and a transparent cover or spreader sheet carrying a polymeric acid-reacting layer and a timing layer. Integral negative-positive film units of this second type include an opaque processing composition which is distributed after photoexposure to provide a second opaque layer which can prevent additional exposure of the photosensitive element. In film units of this second type, exposure is made through the transparent cover or spreader sheet. The desired transfer image is viewed against the reflecting pigment-containing layer through the transparent support element.

The arrangement and order of the individual layers of the diffusion transfer film units described herein may vary in many ways as known in the art. For convenience, however, the more specific descriptions of the inventive application hereinafter set forth will be by use of dye developer diffusion transfer film units of the types generally contemplated in previously mentioned patents. Thus, details relating to integral negative-positive film units of the first type described hereinbefore can be found in such patents as U.S. Pat. Nos. 3,415,644 and 3,647,437 while details of the second type are found in U.S. Pat. No. 3,594,165. It will be readily apparent from such descriptions that other image-forming reagents may be used, e.g., color couplers, coupling dyes, or compounds which release a diffusible dye or dye intermediate as a result of coupling or oxidation.

Figure 2:
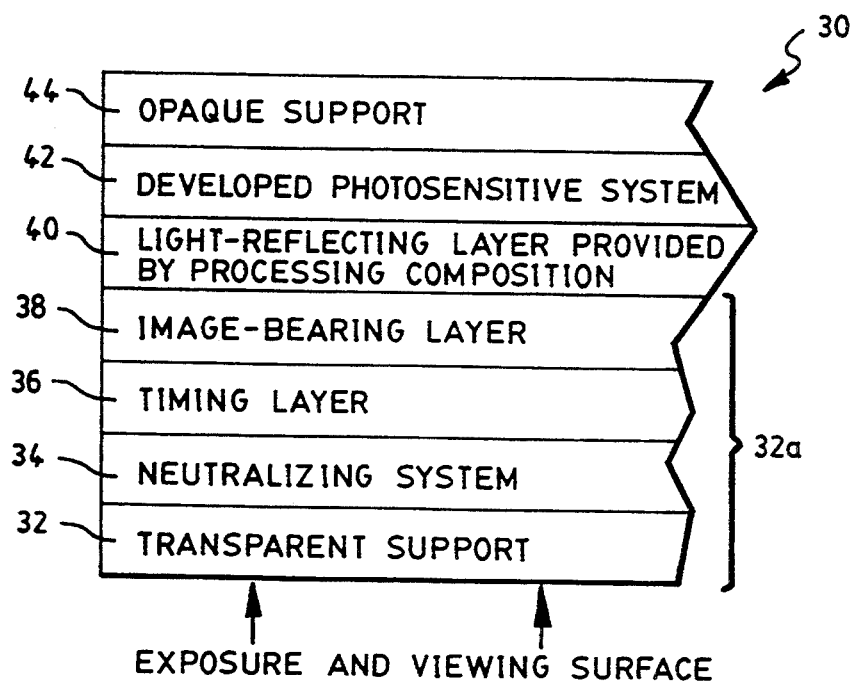
FIGS. 2 to 4 are schematic cross-sectional views of particular arrangements of film units, shown after exposure and processing, each having a neutralization layer into which the composition of the present invention may be incorporated.

Referring now to the drawings, FIG. 2 shows a film unit of the type described in referenced U.S. Pat. Nos. 3,415,644 and 3,657,437, following exposure and processing. The film unit 30 includes an image-bearing layer 38, timing layer 36, and neutralizing system 34 incorporating a two-phase acidic aqueous composition according to the present invention. After photoexposure of photosensitive layer(s) 42 (through transparent support 32, neutralizing system 34, timing layer 36, and image-bearing layer 38) the processing composition retained in a rupturable container (not shown) is distributed between layers 38 and 42. Processing compositions used in such film units of the present invention are aqueous alkaline photographic processing compositions comprising a reflecting pigment, usually titanium dioxide, and a polymeric film-forming agent and will preferably contain an optical filter agent described in detail in U.S. Pat. Nos. 3,647,437 and 4,680,247.

Distribution of the processing composition over photoexposed portions of photosensitive system 42 provides a light-reflecting layer 40 between image-bearing layer 38 and photosensitive layer(s). This layer, at least during processing, provides sufficient opacity to protect photosensitive system 42 from further photoexposure through transparent support 32. As reflective layer 40 is installed, by application of the processing composition, development of photoexposed photosensitive layer(s) 42 is initiated to establish in manners well-known in the art an imagewise distribution of diffusible image-providing material which can comprise soluble silver complex or one or more dye or dye intermediate image-providing materials. The diffusible image-providing materials is transferred through permeable, light reflecting layer 40 where it is mordanted, precipitated or otherwise retained in or on image-bearing layer 38. The resulting transfer image is viewed through transparent support 32 against light-reflecting layer 40.

The light-reflecting layer 40 provided by the embodiment of the invention shown in FIG. 2 is formed by solidification of the stratum of the processing composition distributed after exposure. The processing composition will include the film-forming polymer which provides the polymeric binder matrix for the light-reflecting pigment of layer 40. Absorption of water from the applied layer of processing composition results in a solidified film comprising the polymeric binder matrix and the pigment material, thus providing the light reflecting layer 40 which permits the viewing there against of image 38 through transparent support 32. In addition, light-reflecting layer 38 serves to laminate together the developed photosensitive system 42 and the image-bearing layer 38 to provide the final photographic laminate.

In order to ensure that pH reduction effected by the two-phase acidic aqueous neutralizing system occurs after a sufficient, predetermined period and not prematurely so as to interfere with the development process, the neutralizing system preferably is associated with a timing layer 16 ("diffusion control time modulating layer"). Ideally, this time modulating layer should initially be impermeable to alkali and then, after a brief predetermined period, should allow alkali to penetrate it readily to be depleted by the neutralizing system and thereby shut-down the development process.

Accordingly, in each of the articles shown in FIGS. 1 to 4 is shown a timing layer which is included for the control of the pH-reducing properties of the neutralizing system according to embodiments of the present invention. Thus, there is shown in FIG. 2 timing layer 36 positioned between neutralizing system 34 and image-bearing layer 38. The timing layer will typically be comprised of polyvinyl alcohol, gelatin or other polymer through which the alkali may diffuse to the neutralizing system. The presence of such timing layer between the image-receiving layer 38 and the acid-reacting layer 34 effectively controls the initiation and the rate of capture of alkali by the acid reacting layers and the advantages thereof in diffusion transfer systems are described with particularity in U.S. Pat. Nos. 3,362,819; 3,419,389; 3,421,893; 3,455,686; 3,577,237, and 3,575,701.

In the film unit shown in FIG. 2, neutralizing system 34 and the timing layer 36 are shown on transparent support 32. If desired, layers 34 and 36 can be positioned between opaque support 44 and photosensitive layer(s) 42. Thus, neutralizing system 34 can be positioned on opaque support 44 and timing layer 36 can be positioned on the neutralizing system. In turn, the emulsion layer(s) comprising photosensitive 42 can be positioned on the timing layer. In this case, image-receiving element 32a will comprise transparent support, and directly thereon, image-bearing layer 38. For reference, the utilization of previous polymeric acid-reacting layers and timing layers in a photosensitive element is described in U.S. Pat. Nos. 3,362,821 and 3,573,043.

In accordance with an embodiment of the invention, a photographic film unit can comprise a temporary laminate including the several layers of the photographic film unit confined between two dimensionally stable supports and having the bond between a predetermined pair of layers being weaker than the bond between other pairs of layers. Thus, with reference to FIG. 2, an image-receiving element 32a, comprising transparent support 32, neutralizing system 34, timing layer 36, and corresponding generally to image-receiving element 10 of FIG. 1, can be arranged in article 30 such that image-receiving layer 38 is temporarily bonded to the silver halide emulsion layer 42 prior to exposure. The rupturable container or pod (not shown) can then be positioned such that, upon its rupture, the processing composition will delaminate the temporary bond and be distributed between the aforesaid layers 38 and 42. The distributed layer of processing composition upon drying forms light-reflecting layer 40 which serves to bond the layers together to form the desired permanent laminate. Procedures for forming such prelaminated film unit, i.e., film units in which the several elements are temporarily laminated together prior to exposure, are described, for example, in U.S. Pat. No. 3,652,281, issued to Albert J. Bachelder and Frederick J. Binda on Mar. 28, 1972, and U.S. Pat. No. 3,652,282, issued to Edwin H. Land on even date. A particularly useful and preferred prelamination utilizes a water-soluble polyethylene glycol as describes and claimed in U.S. Pat. No. 3,793,023, issued Feb. 19, 1974 to Edwin H. Land.

If desired, the film unit shown in FIG. 2 may utilize a transparent support instead of the opaque support 44 shown therein. In accordance with this alternative embodiment, an opaque layer, e.g., pressure-sensitive, should be superposed over said transparent support to avoid further exposure through the back of the film unit during processing outside of the camera. In the embodiment illustrated in FIG. 2, photoexposure is effected through the image-receiving element. While this is a particularly useful and preferred embodiment, it will be understood that the image-receiving element may be initially positioned out of the exposure path and superposed upon the photosensitive element after photoexposure, in which event the processing and final image stages would be the same as in FIG. 2.

Figure 3:
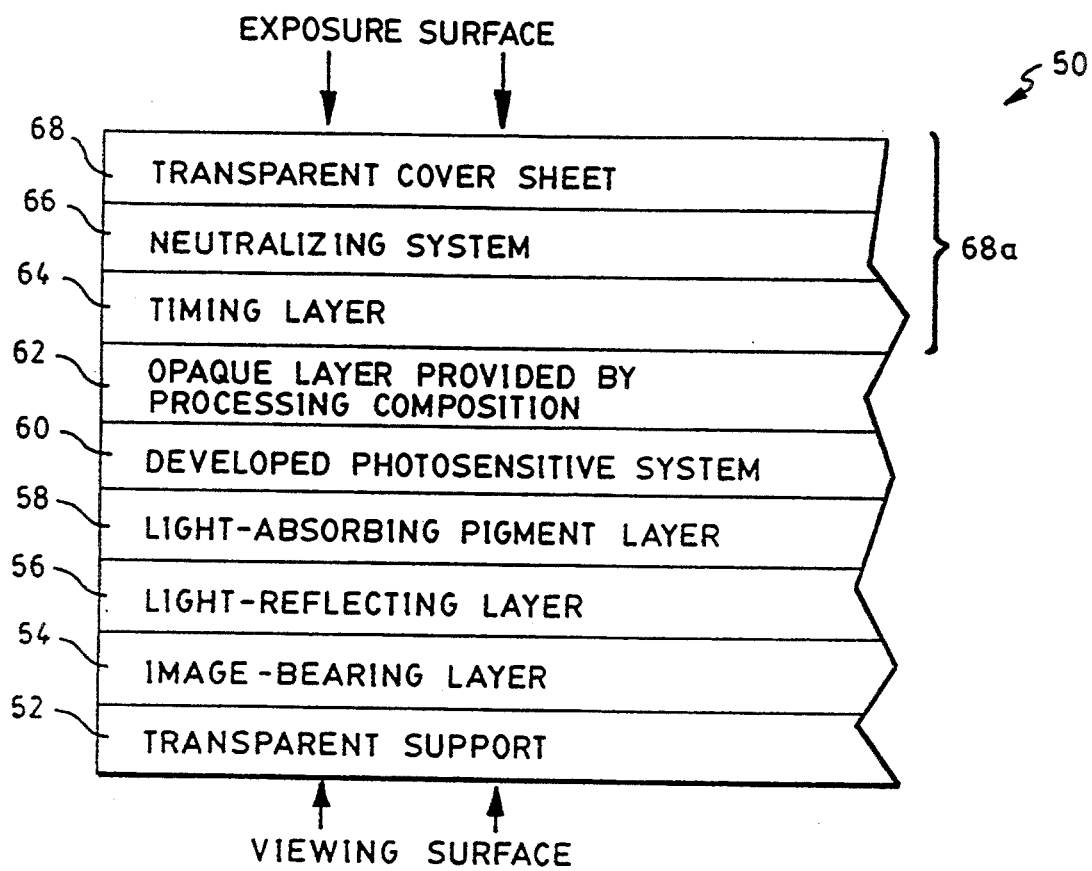
Figure 4:
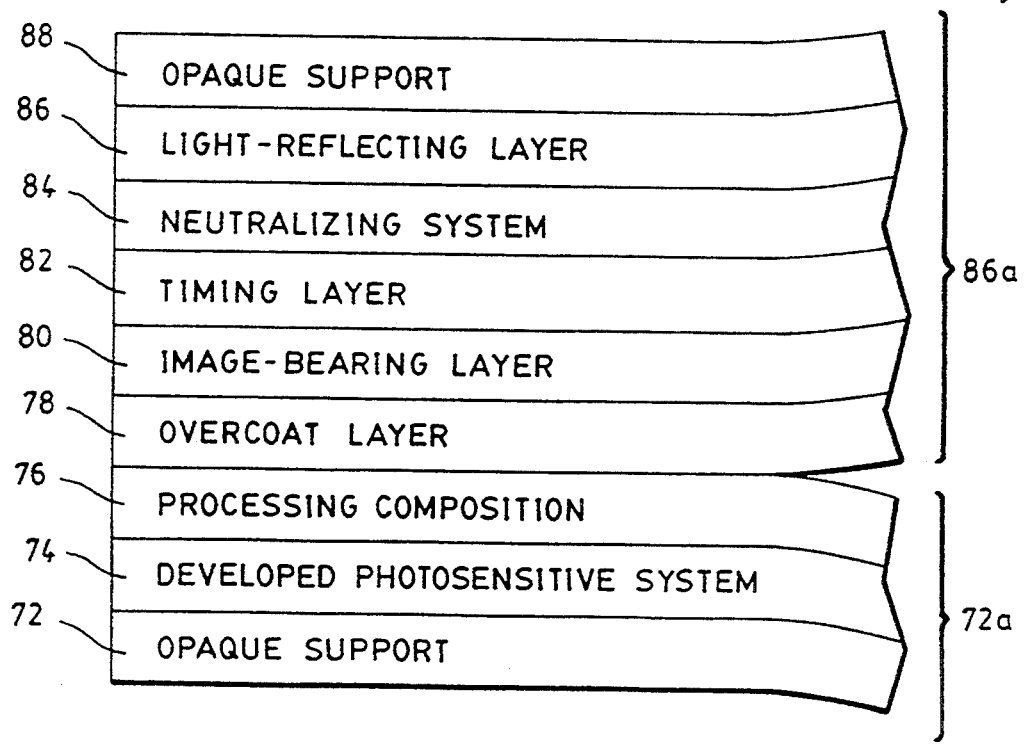

In FIG. 3 is shown, following exposure and processing, a second integral negative-positive type of diffusion transfer film unit utilizing and arrangement of elements generally described in U.S. Pat. No. 3,594,165 and British Pat. No. 1,330,524. Such arrangement provides an integral negative-positive reflection print and photoexposure and viewing are effected from opposite sides. Film unit 50 includes a processing composition initially retained in a rupturable container (not shown) arranged to distribute the processing composition between the photosensitive system or layer 66 and a cover or spreader sheet 68a comprising a transparent sheet material 68, a neutralizing system 66 according to the present invention and a timing layer 154. Spreader sheet 68a facilitates uniform distribution of processing composition after photoexposure of photosensitive system or layer 60 which is effected through transparent sheet material 68. Processing compositions used in such film units are aqueous, alkaline photographic processing compositions which include a light absorbing opacifying agent, e.g., carbon black.

Distribution of the processing composition between photoexposed photosensitive system or layer 60 and spreader sheet 68a installs an opaque layer 62 which protects system or layer 60 from further photoexposure through transparent spreader sheet 68a. Like the film units of FIG. 3, as and after opaque layer 62 is installed, the processing composition initiates development of photoexposed photosensitive system or layer 60 to establish an imagewise distribution of diffusible image-providing materials in manners well-known to the art. For example, the processing composition may contain developing agents sufficient to effect photographic development. Alternatively, developing agents may be present in one or more layers of the film unit so that they may be carried to system or layer 60 by the processing composition. The diffusible imagewise distribution is transferred to image-receiving layer 54 through permeable light-reflecting layer 56 which comprises a preformed layer including a light-reflecting pigment. Film units of the type shown in FIG. 3 may also comprise a preformed and permeable opaque layer 58 including a light-absorbing pigment, e.g., a dispersion of carbon black in a polymer permeable to processing composition. Such layer, between photosensitive system or layer 60 and light-reflecting layer 56, permits in-light development of film unit 50, providing opacification for the protection of photoexposed photosensitive system or layer 60 against further exposure through transparent support 52 and layers 54 and 56. The transferred image is viewed through transparent support 52 against light-reflecting layer 56.

In further embodiments, two-phase acidic aqueous compositions of the present invention can be utilized in neutralizing systems for so-called "peel apart" diffusion transfer film units designed to be separated after processing. Such a diffusion transfer film unit of the invention is shown in FIG. 4 as film unit 70, The film unit shown in FIG. 4 comprises a photosensitive element comprising an opaque support 72 carrying a photosensitive layer or system 74. In film units of this type, the photosensitive layer or system 74 is photoexposed and a processing composition 76 is then distributed over the photoexposed layer or system 74. An image-receiving element 86a, corresponding generally to image-receiving element 10 of FIG. 1, is superposed on the photoexposed photosensitive element 74. As shown in FIG. 4, image-receiving element 86a comprises an opaque support material 88, and a light reflecting layer 86; against which the desired transfer image in viewed and which typically will comprise a polymefic matrix containing a suitable white pigment material, e.g., titanium dioxide. A neutralizing system 84 according to the present invention is shown positioned on light-reflecting layer 86 on which is shown timing layer 82, the image-receiving layer 80 of the invention and, in turn, overcoat layer 78, each of which layers is comprised of materials described hereinbefore in connection with the articles of film units shown in FIGS. 1 to 3. Like the film units shown in FIGS. 2 and 3, the processing composition permeates photoexposed photosensitive layer or system 74 to provide an imagewise distribution of diffusible dye image-providing material which is transferred at least in part to image-receiving layer 78. Unlike the film units of FIGS. 2 and 3, however, the transferred dye image is viewed in image-bearing layer 80 against light-reflecting layer 66 after separation of image-receiving element 86a from photosensitive element 7a.

While support material 88 of image-receiving element 86a is shown as being of opaque material, it will be appreciated that a transparent support material can be employed and that the film unit can be processed in the dark or an opaque sheet (not shown), preferably pressure-sensitive, can be applied over such transparent support to permit in-light development. In accordance with an embodiment of the invention, whereby a reflection print is provided upon separation of image-receiving element 86a from photosensitive element 72a, opaque support 88 and light-reflecting layer 86, will comprise, for example, a suitable paper support, coated, preferably on both sides, with a polymeric coating, e.g., polyethylene, pigmented with titanium dioxide. Such a support material can be suitably provided with neutralizing system 84 according to an embodiment of the present invention, a timing layer 82, an image-bearing layer 80, and an optional overcoat layer 78, as shown in FIG. 4 with formation of image-receiving element 86a.

It will be appreciated that, where a transparency is desirably provided from a film unit 70 of FIG. 4, support 88 can be transparent and light reflecting layer 86 omitted. The desired image in image-beating layer 80 can then, upon separation of image-receiving element 86a from photosensitive element 72a, be viewed as a positive transparency through transparent support material 88.

The film units illustrated in FIGS. 2 to 4 have, for convenience been shown as monochrome films. Multicolor images may be obtained by providing the requisite number of differentially exposable silver halide emulsions, and said silver halide emulsions are most commonly provided as individual layers coated in superposed relationship. Film units intended to provide multicolor images comprise two or more selectively sensitized silver halide layers each having associated therewith an appropriate image dye-providing material providing an image dye having spectral absorption characteristics substantially complementary to the light by which the associated silver halide is exposed. The most commonly employed negative components for forming multicolor images are of the "tripack" structure and contain blue-, green- and red-sensitive silver halide layers each having associated therewith in the same or in a contiguous layer a yellow, a magenta and a cyan image dye-providing material, respectively. Interlayers or spacer layers may, if desired, be provided between the respective silver halide layers and associated image dye-providing materials or between other layers. Integral multicolor photosensitive elements of this general type are disclosed in U.S. Pat. No. 3,345,163, issued Oct. 3, 1967, to Edwin H. Land and Howard G. Rogers, as well as in the previously noted U.S. Patents, e.g. , in FIG., 9 of the aforementioned U.S. Pat. No. 2,983,606.

The image dye-providing materials which may be employed in such processes generally may be characterized as either (1) initially soluble or diffusible in the processing composition, but are selectively rendered nondiffusible in an imagewise pattern as a function of development; or (2) initially insoluble or non-diffusible in the processing composition, but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples, of initially soluble or diffusible materials and their applications in color diffusion transfer, mention may be made of those disclosed, for example, in U.S. Pats. Nos. 2,774,668; 2,968,554; 2,983,606; 2,087,817; 3,185,567; 3,230,082; 3,345,163, and 3,443,943. As examples of initially non-diffusible materials and their use in color transfer system, mention may be made of the materials and systems, disclosed in U.S. Pats. Nos. 3,185,567; 3,443,939; 3,443,940; 3,227,550, and 3,227,552. Both types of image dye-providing substances and film units useful therewith also are discussed in U.S. Pat. No. 3,647,437 to which reference may be made.

In addition to the above description of the layers comprising the several diffusion transfer product and process embodiments illustrated in FIGS. 1 to 4, an optional barrier layer (not shown) may also be utilized. In this regard, and depending on composition, such barrier layers can function simply as spatial separators or they can provide specified time delays by swelling at controlled rates or undergoing reactions such as hydrolysis or dissolution. In general, the barrier layer, if utilized together with the present invention, should typically be deposited over the neutralizing system to minimize the sink-in of the timing layer and the transfer of water from the timing layer and negative during deposition. Such barrier layer is typically designed to maintain a surface pH of approximately 5 for 2–3 minutes in contact with water, yet 'open' rapidly at high pH to allow neutralization of the alkaline reagent after processing. One commercially available composition that may be considered for use as a barrier layer is DOW PRIMACOR 5890 (ethylene-acrylic acid copolymer, 20 wt % AA). Other compositions may be selected based on desired functionality and/or compatibility.

The polymeric neutralizing system can be deposited at any amount which is effective for the intended purpose. Preferably, it is deposited at a thickness on the order of 0.3 to 1.5 mil. and at a coverage in the range of 13.5 to 22.5 milliequivalents acid/ft$^2$, depending upon the alkali content of the activator which is to be neutralized.

The following examples are provided to further illustrate the invention. Unless otherwise noted, microaggregate concentrations were measured on a 45 μm nominal size filter.

EXAMPLES

Reference Example A

A two-phase high-acid aqueous composition (60:40 AA:BuA) was prepared through the simultaneous synthesis of both aqueous and particle phases. The resulting composition had microaggregates in amounts undesirable for photographic applications.

More specifically, in a 12 l round bottom flask with a stirrer set at 280 rpm, 6209.9 g distilled water was heated to 80° C. while deaerating. A 147.6 g seed was taken from an AA:BuA monomer mix and charged into the reactor. The AA:BuA monomer mix was prepared from 1768.3 g acrylic acid, 1176.4 g butyl acrylate, and 7.9 g divinyl benzene. After mixing the reactor solution charged with the seed for 10 minutes, a solution of 29.15 g ammonium persulfate in 713.8 g distilled water was added over 15 minutes. The remaining AA:BuA monomer mix was then gradually fed into the reactor over a period of 180 minutes (feed rate 16.7 ml/min.). At the end of the feed, the solution was held at 80° C. for 30 minutes, then cooled to 50° C. 8.3 g t-butyl peroxybenzoate was added, followed by 4.4 g sodium bisulfite in 71.4 g distilled water. The solution was held at 50° C. for 60 minutes. Analysis of the two-phase high-acid aqueous composition revealed a comparatively high microaggregate concentration of 0.3466%.

Reference Examples B

Several two-phase high-acid aqueous composition were prepared through the simultaneous synthesis of both aqueous and particle phases. The synthesis for each composition followed in essence the process of Reference Example A, but with certain modifications. For the synthesis of one composition, potassium-styrene-sulfonate was charged into the reactor flask prior to the addition of the AA:BuA monomer mix. For the synthesis of another composition, acrylamido-2-methyl-1-propanesulfonic acid (AMPS) was fed simultaneously with the AA:BuA monomer mix. In another synthesis, the AMPS modified process was further refined by the use of a Dialyzed Dowfax 2A1 (Dowfed) surfactant (from Dow Chemical Co.) in the seed. Analysis of compositions from the potassium-styrene-sulfonate modified process, the AMPS modified process, and the AMPS/Dowfad modified process revealed comparatively high microaggregate concentrations of 0.6467%, 0.18%, 0.42%, respectively.

Reference Example C

A two-phase high-acid aqueous composition (50:50 AA:BuA) was prepared through the simultaneous synthesis of both aqueous and particle phases. The synthesis followed in essence the process of Reference Example A. (The AA:BuA monomer mix was prepared from 606.0 g acrylic acid, 609.5 g butyl acrylate, and 4.1 g divinyl benzene). However, a neutralized linear poly(acrylic acid) (Goodrite K702, from BF Goodrich) was added as a colloidal stabilizer in the initial distilled water (2691.3 g) charge. Analysis of the resulting composition revealed a microaggregate concentration of 0.194%.

Example 1

A two-phase high-acid aqueous composition was prepared through a "blending" method.

More specifically, an AA:BuA monomer mix was prepared from 956 g butyl acrylate, 239.3 g acrylic acid, 4.0 g divinyl benzene and 20.63 g Dowfad (from Dow Chemical Co.). A 61.0 g seed was taken from the AA:BuA monomer mix and added into a 80° C. poly(acrylic acid) solution prepared from 336.3 g ISX 1690 (35.7%) (linear PAA from BF Goodrich) in 2400 g of distilled water. The solution was stirred for 5.5 minutes at 160 rpm. An initiator solution prepared from 5.73 g potassium persulfate in 140 g distilled water was added over 10.22 minutes. Stirring continued for an additional 10 minutes. The remaining AA:BuA monomer mix was fed into the system over 240 minutes. After 210 minutes, the stir rate was increased to 240 rpm. At the conclusion of the monomer feed, the system was post-heated at 80° C. for 45 minutes, then cooled to 50° C. for over 15 minutes. 3.2575 g t-butyl peroxybenzoate and 1.725 g sodium bisulfite in 25 g distilled water was subsequently added. The system was post-heated an additional 45 minutes at 50° C., stirred at 400 rpm, then allowed to cool at room temperature. Analysis of the intermediate 20:80 AA:BuA composition revealed the following: Solids, 32.07% (71.75% BuA; 28.84 AA); Microaggregates, 0.0254 g/100 g composition (0.025%); pH 2.18; Viscosity, 530 cps (Brookfield, #3 spindle, 60 rpm). 2400 g of the intermediate 20:80 AA:BuA particle phase composition was blended with 1336.8 g Goodrite K702 (25.8%) (partially neutralized linear PAA from BF Goodrich) to form the aqueous phase, bringing the composition to 50:50 AA:BuA. Analysis of the resulting two-phase high-acid aqueous composition revealed the following: Solids, 29.44%; Microaggregates, 0.0076 g/50.0 g composition (0.015%).

Example 2

A two-phase high-acid aqueous composition was prepared through a "blending" method.

More specifically, the procedure proceeded as Example 1, but in contrast, utilized the following components: the initial poly(acrylic acid) solution utilized 347.8 g ISX 1690 (34.5%) in 2400 g distilled water; the AA:BuA monomer mix utilized 837.3 g butyl acrylate, 358.7 g acrylic acid, 4.0 g divinyl benzene and 20.63 g Dowfad (12.9%); and the initiator solution utilized 5.73 g potassium persulfate in 140 g distilled water. 61.0 g of the AA:BuA monomer mix was used for the seed. The system was post-heated 60 minutes at 80° C., cooled to 50° C. for over 15 minutes, sodium bisulfite and t-butyl peroxybenzoate added thereafter, and the system subsequently post-heated 45 minutes at 50° C. Analysis of the intermediate 20:80 AA:BuA composition revealed the following: Solids, 31.85%; Microaggregates, 0.0123 g/100 g composition (0.012%); pH 2.08; Viscosity, 93 cps (Brookfield, #2 spindle, 60 rpm); Coagulum, 0.0986 g. 2800 g of the intermediate 20:80 AA:BuA composition was blended with 936.7 g of Goodrite K702 (25.8%), bringing the composition to 50:50 AA:BuA. Analysis of the resulting two-phase high-acid aqueous composition revealed the following: Solids, 29.8%;Microaggregates, 0.0110 g/100 g composition (0.011%).

Example 3

A two-phase high-acid aqueous composition was prepared through the "blending" method of Example 1 without the use of Dowfad.

More specifically, the procedure proceeded as Example 1 with the AA:BuA monomer mix modified to have 956.8 g butyl acrylate, 239.3 g acrylic acid, and 4.0 g divinyl benzene. 60.0 g of the AA:BuA toohomer mix was used for the seed. Analysis of the intermediate AA:BuA composition revealed the following: Solids, 32.37%; Microaggregates, 0.0067 g/100 g composition (0.006%); pH 2.26; Viscosity, 80 cps (Brookfield, #2 spindle, 60 rpm); Coagulum, 0.026 g. 2320.8 g of the intermediate 20:80 AA:BuA composition was blended with 1354.4 g Goodrite K702 (24.9%), bringing the composition to 50:50 AA:BuA. Analysis of the resulting two‚phase high-acid aqueous composition revealed the following: Microaggregates, 0.0085 g/100 g composition (0.008%); Viscosity, 390 cps (Brookfield, #2 spindle, 60 rpm).

Example 4

An intermediate 20:80 AA:BuA composition was prepared according to the pertinent initial steps of Example 2 without the use of Dowfad. The AA:BuA monomer mix was modified to have 837.3 g butyl acrylate, 358.7 g acrylic acid, and 4.0 g divinyl benzene. 60.0 g of the AA:BuA monomer mix was used for the seed. Analysis of the intermediate 20:80 AA:BuA composition revealed the following: Solids, 32.61%, Microaggregates 0.0041 g/100 g composition (0.004%), pH 2.32, Viscosity 95 cps (Brookfield, #2 spindle, 60 rpm).

Example 5

A two-phase high-acid aqueous composition was prepared through a variant "blending" process, wherein the final poly(acrylic acid) addition occurs during the latter part of the particle phase polymerization (cf. "in-situ blending").

More specifically, a 5 l four-necked round bottom flask was fitted with a mechanical stirrer, thermometer, nitrogen inlet tube, monomer feed line, initiator feed line, reflux condenser, sampling tube and addition funnel. The flask was charged with 1500.0 g distilled water and 218.8 g ISX 1690 (34.4%) (linear PAA from BF Goodrich) and then heated to 79° C. while deaerating with nitrogen. The nitrogen line was placed below the solution surface and the rate monitored by a bubble counter attached to the outlet of the reflux condenser. The stir rate was maintained at 200 rpm. When the reactor contents reached 80° C., the nitrogen line was raised well above the solution surface 37.6 g of an AA:-BuA monomer mix was introduced into the reactor vessel. The AA:BuA monomer mix was prepared from 600.0 g butyl acrylate, 150.0 g acrylic acid, and 2.5 g divinyl benzene. Immediately after the addition of the seed charge, an initiator solution was prepared by adding 3.033 g ammonium persulfate into 88.8 g distilled water and rapidly stirred under a nitrogen blanket to effectuate dissolution. 10 minutes after addition of the seed charge, the initiator solution was introduced into the reactor over 10 minutes using a pump calibrated to deliver 9.18 cc./min. 5 minutes after completion of the initiator addition, the balance of the A/BuA monomer mix was fed into the reactor over 240 minutes using a pump calibrated to deliver 3.31 cc./min. Throughout, the reactor temperature was maintained at 80° C. Three hours into the monomer feed, feed of 1430.3 g Goodrim K702 (26.2%) (partially neutralized linear PAA from BF Goodrich) was commenced. The K702 poly(acrylic acid) was delivered over 165 minutes through the addition funnel calibrated to a flow rate of 8.67 cc./min. (The K702 feed generally overlapped the last hours of the monomer feed and its end coincided with the initiation of the post-heat). Following the monomer addition, the temperature was maintained at 80° C. for 30 minutes and subsequently cooled to 50° C. for over approximately 15 minutes. Once the temperature reached 50° C., 2.043 g t-butyl peroxybenzoate was added through the sampling tube, followed by a solution of 1.080 g sodium metabisulfite in 12.5 g distilled water. Addition of each approximated 10 seconds. The reaction was then heated at 50° C. for 60 minutes, then cooled to room temperature. Analysis of the resulting two-phase high-acid aqueous composition revealed the following: Solids, 30.0%; Microaggregates, 0.0074 g/100 g composition (0.007% ); pH 2.7; Viscosity, 600 cps (Brookfield, #2 spindle, 60 rpm), Coagulum, none.

Example 6

A two-phase high-acid aqueous composition was prepared through an "in-situ blending" process similar to Example 5, but wherein the final poly(acrylic acid) addition occurred throughout the particle phase polymerization. Analysis of the resulting two-phase high-acid aqueous composition revealed the following: Solids, 26.8%; pH 2.8; Viscosity, 800 cps (Brookfield, #2 spindle, 60 rpm), Coagulum, 2.3%.

Example 7

A two-phase high-acid aqueous composition (50:50 AA:BuA) was prepared according to an "in situ synthesis" process.

More specifically, in a 3 l reaction flask equipped with a mechanical stirrer, reflux condenser, nitrogen inlet line, thermometer, and feed lines, 1551.3 g distilled water was heated to 80° C. while aleaerating with nitrogen introduced into the system below water level at a flow of approximately 5 psi. 45 g of acrylic acid were added and followed by the addition of an initiator solution made from 3.51 g potassium persulfate in 90 g distilled water. Allowing the polymerization of the acrylic acid seed to continue for 20 minutes, an AA:BuA monomer mix was fed into the reactor over 227.16 minutes at a feed rate of 3.5 ml/min. The AA:BuA monomer mix was prepared from 321.3 g acrylic acid, 366.3 butyl acrylate, and 2.5 g divinyl benzene. The solution was held at 80° C. for an additional 30 minutes, then cooled to 50° C. 1.99 g t-butyl peroxybenzoate was added, followed by addition of 1.05 g sodium bisulfate in 17.2 g distilled water. The solution was then held at 50° C. for a final 60 minutes. Analysis of the resulting two-phase high-acid aqueous composition revealed the following: Solids, 30.98%, Microaggregates, 0.0498 g/100 g composition (0.049%); Viscosity, 888 cps. (#2 spindle, 60 rpm); Coagulation, <0.01%. Partitioning data are as follows: Aqueous Phase Composition, 92.26:7.74 AA:BuA; Particle Phase Composition, 25.22:74.78 AA:BuA.

Example 8

A two-phase high-acid aqueous composition (30:70 AA:BuA) was prepared according to an "in-situ synthesis" process, similar to Example 7.

More specifically, in a reaction flask equipped with a mechanical stirrer (225 rpm), reflux condenser, nitrogen inlet line, thermometer, and feed lines, 2585.3 g distilled water was heated to 80° C. while deaerating. With the system sparged with nitrogen as Example 7, 75 g of acrylic acid were added and followed by the addition of an initiator solution made from 3.32 g potassium persulfate in 150 g distilled water. At the conclusion of the "in situ" polymerization of the acrylic acid seed, an AA:BuA monomer mix was fed into the reactor over 191 minutes at a feed rate of 6.5 ml/min. The remaining steps (post-catalyst steps) followed essentially as Example 7 utilizing 3.32 g t-butyl peroxybenzoate and a solution of 5.85 g potassium bisulfate in 150 g distilled water. Analysis of the resulting two-phase high-acid aqueous composition revealed the following: Solids, 30.96%; Microaggregates, 0.0014%; Viscosity, 75 cps (#3 spindle, 60 rpm). Partitioning data are as follows: Aqueous Phase Composition, 92.28:7.72 AA:BuA; Particle Phase Composition, 44.49:55.51 AA:BuA.

Example 9

A two-phase high-acid aqueous composition was prepared according to an "in situ synthesis" process, similar to Examples 7 and 8, however the initiator potassium persulfate was substituted with ammonium persulfate.

More specifically, in a 5 l reaction flask equipped with a mechanical stirrer (200 rpm), reflux condenser, nitrogen inlet line, thermometer, and feed lines, 2705.3 g distilled water was heated to 80° C. while deaerating. After the system was sparged with nitrogen as Example 7, 75.0 g of acrylic acid were added and followed by the addition of an initiator solution made from 4.93 g ammonium persulfate in 30.0 g distilled water. At the conclusion of the "in situ" polymerization of the acrylic acid seed, an AA:BuA monomer mix was fed into the reactor at a feed rate of 5.5 ml/min. The AA:BuA monomer mix was prepared from 535.5 g acrylic acid, 610.5 g butyl acrylate, and 4.2 g divinyl benzene. The remaining steps (post-catalyst steps) followed in essence Example 7, utilizing 3.32 g t-butyl peroxybenzoate and a solution of 2.18 g sodium bisulfite in 28.7 g distilled water. Analysis of the resulting two-phase high-acid aqueous composition revealed the following: Solids, 31.1%; Microaggregates, 0.07%; pH 2.1; Viscosity, 600 cps (#2 spindle, 60 rpm).

Example 10

A two-phase high-acid aqueous composition was prepared according to a "multi-staged continuous synthesis" process.

More specifically, a reactor vessel was equipped with a mechanical stirrer, a reflux condenser, a thermometer, an $N_2$ inlet line, a monomer feed line and a sampling tube/initiator injection line. 2747.72 g distilled water was heated to 80° C. while deaerating. 75 g acrylic acid was added to the reactor, stirred, then followed by an initiator solution prepared from 4.93 g ammonium persulfate in 30.0 g distilled water. After stirring for approximately 25 minutes, a AA:BuA monomer mix was gradually fed into reactor vessel over a period of 197.26 minutes. The AA:BuA monomer mix was prepared from 194.1 acrylic acid, 597.9 g butyl acrylate, and 4.0 g divinyl benzene. At the conclusion of the AA:BuA monomer feed, an acrylic acid monomer mix was gradually fed into the reactor vessel over a period of 56.0 minutes. The acrylic acid monomer mix was prepared from 328.8 g acrylic acid and 5.0 g isopropanol. The solution was then held at 80° C. for 30 minutes, then cooled to 50° C. 3.32 g t-butyl peroxybenzoate was added and the solution mixed for 5 minutes. The solution was held at 50° C. for 60 minutes with a solution of 2.5 g sodium bisulfite in 12.5 g distilled water added within the first 15 minutes. The final solution was cooled to 25° C. Analysis of the two-phase high-acid aqueous composition revealed the following: Solids, 29.98%; Microaggregates, 0.003% (on 45 μm) and 0.0157% (on 5 μm); Viscosity, 1410 cps; Coagulum, none).

Example 11

A two-phase high-acid aqueous composition was prepared according to a "multi-staged continuous synthesis" process, having an extended acrylic acid monomer feed time.

A 5 l reaction flask was equipped with a stirrer (set al 200 rpm), condenser, thermometer, nitrogen sparge/sweep, and addition tubes for monomer addition. 2737.4 mls of distilled water were charged into the flask and heated to 80° C. Upon reaching 80° C., the nitrogen sparge was switched to sweep. 84.6 g acrylic acid was charged into the flask and mixed for 5 minutes. An initiator solution of 4.92 g ammonium persulfate in 30.0 mls distilled water was added into the reaction flask and the solution mixed for 20 minutes. An AA:BuA monomer mix was then gradually fed into the reaction flask over a period of 90 minutes (9.0 ml/min.). At the end of the feed, the solution was mixed for an additional 10 minutes. 367.3 g acrylic acid was then gradually fed into the reactor over a period of over 180 minutes (approx. 1.95 ml/min.). The solution was held at 80° C. for 30 minutes, then cooled to 50° C. 3.32 g t-butyl peroxybenzoate was added and mixed at 360 rpm for 5 minutes. A solution of 2.5 g sodium bisulfite in 12.4 mls distilled water was added over 15 minutes. The solution was held at 50° C. for a total of 60 minutes, then cooled to 25° C. Inspection of the resulting two-phase high-acid aqueous composition revealed few microaggregates, and notably, the absence of "skin" formation after handling. Analysis revealed the following: Microaggregates, 0.015% (5 μm); Viscosity, 740 cps (#2 spindle, 60 rpm); Solids, 30.7%.

Example 12

A two-phase high-acid aqueous composition (40:60 AA:BuA) was prepared according to a "multi-staged continuous synthesis" process, having an extended acrylic acid monomer feed time. The process followed in essence the process of Example 11. However, the AA:BuA monomer mix was made from 180.8 g acrylic acid, 723.1 butyl acrylate, and 4.8 g divinyl benzene; and the acrylic acid toohomer feed utilized 216.6 g acrylic acid. As with Example 12, inspection of the resulting two-phase high-acid aqueous composition revealed both few microaggregates and the absence of "skin" formation after handling.

Example 13

A two-phase high-acid aqueous composition (60:40 AA:BuA) was prepared according to a "multi-staged continuous synthesis" process, having an extended acrylic acid monomer feed time. The process followed in essence the process of Example 11. However, the AA:BuA monomer mix was made from 120.6 g acrylic acid, 482.0 butyl acrylate, and 3.2 g divinyl benzene; and the acrylic acid monomer feed utilized 517.9 g acrylic acid. As with Examples 11 and 12, inspection of the resulting two-phase high-acid aqueous composition revealed both few microaggregates and the absence of "skin" formation after handling.

Example 14

A two-phase high-acid aqueous composition was prepared according to an "in situ synthesis" process utilizing an acrylic acid/butyl acrylate seed.

More specifically, in a 3 l reaction flask equipped with a mechanical stirrer (270–280 rpm), reflux condenser, nitrogen inlet line, thermometer, and feed lines, 1469.7 g distilled water was heated to 80° C. while deaerating. After the system was sparged with nitrogen as Example 7, 37.9 g acrylic acid and 4.8 g butyl acrylate were added and followed by the addition of an initiator solution made from 3.51 g potassium persulate in 171.6 g distilled water (10 ml of the potassium persulfate was added an held for 10 minutes, and followed by the remaining solution fed at 24.3 ml/min. At the conclusion of the "in situ" seed polymerization, an AA:-BuA monomer mix (328.4 g acrylic acid, 361.4 g butyl acrylate, and 2.5 g divinyl benzene) was fed into the reactor over 242 minutes at a feed rate of 3.3 ml/min. The remaining steps (post-catalyst steps) followed essentially as Example 7 utilizing 1.99 g t-butylperoxybenzoate and a solution of 1.05 g $NaH_2SO_3$ in 17.2 g distilled water. Analysis of the resulting two-phase high-acid aqueous composition revealed the following: Solids, 31.00%; Microaggregates, 0.193%; Viscosity, 2770 cps (#4 spindle, 60 rpm); Coagulum, <0.01%.

Tables 1A–1C; Acid Partitioning Data for Two-Phase Acidic Aqueous Compositions

Acid partitioning data was collected for two-phase acidic aqueous compositions of varying AA:BuA ratios and varying methods of synthesis.

Acid partitioning involved the separation of aqueous and particle phases by ultracentrifuge, The composition of the aqueous phase polymer was subsequently analyzed through NMR techniques, From the composition of the aqueous phase polymer and the partitioning of the total polymer between aqueous and particle phases, the partitioning of AA and BuA between the two phases was calculated as follows:

$$\frac{BuA_{latex}}{BuA_{total}} = \frac{BuA_{total} - X_{BuA;aq.pol.}Y_{aq.pol}}{BuA_{total}}$$

$$\frac{AA_{aq.pol.}}{AA_{total}} = \frac{X_{AA;aq.pol.}Y_{aq.pol.}}{AA_{total}}$$

$$X_{BuA,latex} = \frac{BuA_{total} - X_{BuA;aq.pol.}Y_{aq.pol.}}{1 - Y_{aq.pol.}}$$

wherein $AA_{aq.pol.}$ is the weight fraction of acrylic acid in aqueous polymer of total polymer, $AA_{total}$ is the weight fraction of acrylic acid in total polymer, $BuA_{latex}$ is the weight fraction of butyl acrylate in latex of total polymer, $\gamma_{aq.pol.}$ is the weight fraction of aqueous polymer in total polymer, $X_{AA;aq.pol.}$ is the weight fraction of acrylic acid in aqueous polymer, $X_{BuA;aq.pol.}$ is the weight fraction of butyl acrylate in aqueous polymer, and $X_{BuA;latex}$ is the weight fraction of butyl acrylate in latex, and $BuA_{total}$ is the weight fraction of butyl acrylate in total polymer. Representative data is set forth in Tables 1A–1C below.

TABLE 1A

Acid Partitioning Data for Two-Phase Acidic Aqueous Compositions of 50:50 AA:BuA Ratios

| % Aqueous Polymer of Total Polymer | Sample Temp. | Aqueous Phase Polymer | | Particle Phase Polymer | |
|---|---|---|---|---|---|
| | | % AA | % BuA | % AA | % BuA |
| 25.5 | 70° C. | 91.5 | 8.46 | 35.8 | 64.2 |
| 24.8 | 70° C. | 89.7 | 10.3 | 29.6 | 63.1 |
| 31.1 | 70° C. | 91.3 | 8.67 | 31.8 | 68.2 |
| 30.9 | 70° C. | 93.7 | 6.28 | 30.5 | 69.5 |
| 31.7 | 80° C. | 87.5 | 12.5 | 32.6 | 67.4 |
| 35.5 | 80° C. | 89.0 | 11.0 | 28.5 | 71.5 |
| 32.8 | 80° C. | 89.0 | 11.0 | 31.0 | 69.0 |
| 32.9 | 80° C. | 88.9 | 11.1 | 30.9 | 69.1 |
| 27.4 | 70° C. | 94.0 | 5.96 | 33.4 | 66.6 |
| 27.9 | 70° C. | 93.7 | 6.27 | 33.1 | 66.9 |
| 31.5 | 75° C. | 88.5 | 11.5 | 32.3 | 67.7 |
| 31.0 | 75° C. | 89.0 | 11.0 | 32.5 | 67.5 |
| 30.5 | 80° C. | 89.8 | 10.2 | 32.5 | 67.5 |
| 28.3 | 80° C. | 89.9 | 10.1 | 34.3 | 65.7 |
| 31.4 | 80° C. | 91.4 | 8.56 | 31.1 | 68.9 |
| 33.45[a] | 80° C. | 96.77 | 3.23 | 26.49 | 73.51 |
| 33.55[a] | 80° C. | 97.54 | 2.46 | 26.00 | 74.00 |
| 36.19[β] | 80° C. | 97.06 | 2.94 | 23.31 | 76.69 |
| 36.83[β] | 80° C. | 96.58 | 3.42 | 22.84 | 77.16 |
| 32.87[β] | 80° C. | 98.89 | 3.11 | 26.07 | 72.96 |

[a]Sample prepared by a Colloidally Stabilized Step-Wise Synthesis.
[β]Sample prepared by an Extended Colloidally Stabilized Step-Wise Synthesis.

TABLE 1B

Acid Partitioning Data for Two-Phase
Acidic Aqueous Compositions of 60:40 AA:BuA Ratios
(Polymerization Temp. 70° C.)

| % Aqueous Polymer of Total Polymer | Aqueous Phase Polymer | | Particle Phase Polymer | |
|---|---|---|---|---|
| | % AA | % BuA | % AA | % BuA |
| 41.8 | 85.3 | 14.7 | 41.8 | 58.2 |
| 45.7 | 91.7 | 8.28 | 33.3 | 66.7 |
| 41.6 | 90.8 | 9.23 | 38.1 | 61.9 |
| 41.8 | 91.3 | 8.73 | 37.5 | 62.5 |
| 42.2 | 91.1 | 8.88 | 37.3 | 62.7 |
| 40.5 | 91.5 | 8.54 | 38.6 | 61.4 |
| 48.14[a] | 89.6 | 10.4 | 32.5 | 67.5 |
| 35.9 | 94.0 | 6.01 | 41.0 | 59.0 |

[a]Polymerization Temperature: 80° C.

TABLE 1C

Acid Partitioning Data for Two-Phase
Acidic Aqueous Compositions of Varying AA:BuA Ratios

| Samples AA:BuA Ratio (Temp.) | % Aqueous Polymer of Total Polymer | Aqueous Phase Polymer | | Particle Phase Polymer | |
|---|---|---|---|---|---|
| | | % AA | % BuA | % AA | % BuA |
| 20:80 (80° C.) | 5.72 | 90.3 | 9.7 | 15.7 | 84.3 |
| 24:76 (80° C.) | 8.35 | 91.5 | 8.5 | 17.6 | 82.4 |
| 24:76 (80° C.) | 9.72 | 91.6 | 8.4 | 16.5 | 83.5 |
| 25:75 (80° C.) | 10.4 | 92.4 | 7.56 | 17.0 | 83.0 |
| 30:70 (80° C.) | 11.5 | 92.3 | 7.72 | 21.9 | 78.1 |
| 36:64 (80° C.) | 16.2 | 93.6 | 6.40 | 25.3 | 74.7 |
| 40:60 (70° C.) | 23.21 | 91.8 | 8.16 | 24.33 | 75.7 |
| 40:60 (70° C.) | 21.27 | 91.7 | 8.33 | 26.04 | 74.0 |

TABLE 2

Curl Data Summary
(@15% rel. hum.)
Two-phase acidic aqueous compositions of varying AA:BuA
ratios were incorporated into diffusion transfer products, the diffusion transfer
products having either an aqueous-based or solvent-based barrier. Curl data
was collected for each sample and are summarized in the table, below. Control
compositions having neutralization layer compositions comprising solvent based
polymers are provided for reference.

| Composition | Method of Synthesis[a] | Meq. | Barrier | Curl[β] |
|---|---|---|---|---|
| Control 1 | Blend of Solvent Based Polymers | 16.5 | None | 44 ± 5 |
| Control 2 | Blend of Solvent Based Polymers | 16.5 | Aqueous-based | 47 ± 4 |
| 40:60 | Simultaneous synthesis | 18.2 | None | 34–36 |
| 50:50 | Simultaneous synthesis | 18.2 | Solvent-based | 43 ± 3 |
| 50:50[γ] | Colloidally stabilized; Blend. | 18.2 | Aqueous-based | 38 ± 5 |
| 50:50 | Colloidally stabilized ("in situ"); simultaneous synthesis | 18.0 | Solvent-based | 45 |
| 50:50 | Colloidally stabilized ("in situ"); simultaneous synthesis | 18.2 | Aqueous-based | 50 ± 3 |
| 50:50 | Colloidally stabilized ("in situ"); simultaneous synthesis | 13.7 | Solvent-based | 42 ± 4 |
| 50:50 | Colloidally stabilized ("in situ"); simultaneous synthesis; no cross-linker | 13.7 | Solvent-based | 38 ± 2 |
| 50:50 | Colloidally stabilized step-wise synthesis | 18.2 | Aqueous-based | 47 ± 5 |
| 50:50 | Colloidally stabilized step-wise synthesis | 16.4 | Solvent-based | 45 |
| 50:50 | Colloidally stabilized step-wise synthesis (extended) | 13.7 | Solvent-based | 38 |
| 50:50 | Colloidally stabilized step-wise synthesis (extended) | 18.2 | Solvent-based | 41 |
| 50:50 | Colloidally stabilized step-wise synthesis (extended) | 21.7 | Solvent-based | 39 |
| 50:50 | Colloidally stabilized step-wise synthesis (extended) | 21.7 | Aqueous-based | 48 |
| 60:40 | Simultaneous synthesis | 18.2 | Aqueous-based | 49 ± 4 |
| 60:40 | Colloidall stabilized step-wise synthesis | 18.2 | Aqueous-based | 53 |

[a]Labels for the methods provided herein refer to methods that are more fully described above and should accordingly be referentially construed.
[β]Curl = $10^3 \times 1/r$, where r is the radius of the curvature. Standard deviation values are provided where at least 4 repeated measurements were available.
[γ]Includes blends utilizing 28:80 AA:BuA and 30:70 AA:BuA particles, with various amounts of Poly(acrylic acid) colloidal stabilizer.

TABLE 3

Post Process pH Measurements
(6 day 49° C./55% rel. hum. incubation)

| Sample | Method of Synthesis[a] | Barrier Layer | Post-Process pH |
|---|---|---|---|
| Control A | Blend of Solvent Based Polymers | None | 7.33 |
| Control B | Blend of Solvent Based Polymers | None | 7.15 |
| Control C | Blend of Solvent Based Polymers | Aqueous Based | 7.24 |
| Sample 1 | Colloidally Stabilized ("in situ"); Simult. Synthesis | Aqueous Based | 6.98 |
| Sample 2 | Colloidally Stabilized ("in situ"); Simult. Synthesis | Aqueous Based | 6.89 |
| Sample 3 | Colloidally Stabilized ("in situ"); Simult. Synthesis | Aqueous Based | 7.18 |
| Sample 4 | Colloidally Stabilized ("in situ"); Simult. Synthesis | Aqueous Based | 6.71 |
| Sample 5 | Colloidally Stabilized ("in situ"); Simult. Synthesis | Aqueous Based | 7.07 |
| Sample 6 | Colloidally Stabilized ("in situ"); Simult. Synthesis | Aqueous Based | 7.06 |
| Sample 7 | Colloidally Stabilized ("in situ"); Simult. Synthesis | Aqueous Based | 7.16 |
| Sample 8 | Colloidally Stabilized ("in situ"); Simult. Synthesis | Aqueous Based | 7.24 |
| Sample 9 | Colloidally Stabilized ("in situ"); Simult. Synthesis | Aqueous Based | 6.98 |
| Sample 10 | Colloidally Stabilized ("in situ"); Simult. Synthesis | Aqueous Based | 7.00 |
| Sample 11 | Colloidally Stabilized ("in situ"); Simult. Synthesis | Aqueous Based | 6.88 |
| Sample 12 | Colloidally Stabilized; Blend | Aqueous Based | 6.95 |
| Sample 13 | Colloidally Stabilized; Step-wise Synthesis | Aqueous Based | 6.88 |

[a]Labels for the methods provided herein refer to methods that are more fully described above and should accordingly be referentially construed.

We claim:

1. A two-phase acidic aqueous composition comprising a continuous aqueous phase and a discontinuous acidic particle phase;

the aqueous phase comprising a water soluble polymer having recurring units of at least an organic acid monomer, the aqueous phase organic acid monomer having at least one ethylenically unsaturated carbon-carbon bond, the aqueous phase organic acid monomer being capable of promoting the solubility of the aqueous phase polymer in water, the aqueous phase organic acid monomer being in a concentration effecting solubility of the aqueous phase polymer in water;

the acidic particle phase comprising a water insoluble polymer having recurring units of at least an organic acid monomer and an organic ester monomer, the organic acid monomer having at least one ethylenically unsaturated carbon-carbon bond and being capable of forming salts with alkali metals or with organic bases, the particle phase organic ester monomer having at least one ethylenically unsaturated carbon-carbon bond and capable of promoting the insolubility of the particle phase, the particle phase organic acid monomer and the particle phase organic ester monomer being in a ratio effecting insolubility of the particle phase polymer in the aqueous phase; and the particle phase organic acid monomer capable of interacting with the aqueous phase polymer at an interface between the particle phase and the aqueous phase such that the particle phase polymer is brought into intimate association with the continuous aqueous phase, whereby the particle phase is stably dispersed in the aqueous phase, and the organic acid monomer units and the organic ester monomer units of the particle phase polymer being at a monomeric ratio of approximately 10:90 by weight to approximately 40:60 by weight.

2. The two-phase acidic aqueous composition of claim 1, wherein the aqueous phase organic acid monomer is the same as the particle phase organic acid monomer.

3. The two-phase acidic aqueous composition of claim 1, wherein the aqueous phase polymer further comprises recurring units of an organic ester monomer; and the aqueous phase organic acid monomer units and the aqueous phase organic ester monomer units being in a ratio effecting solubility of the aqueous phase polymer in water.

4. The two-phase acidic aqueous composition of claim 3, wherein the aqueous phase organic ester monomer is the same as the particle phase organic ester monomer.

5. The two-phase acidic aqueous composition of claim 4, wherein the total organic acid monomer units and total organic ester monomer units of the composition has a ratio of approximately 50:50 by weight;

the polymeric ratio of particle phase polymer to total polymer content is approximately 1:3 by weight, and the polymeric ratio of aqueous phase polymer to total polymer is approximately 2:3 by weight;

the monomeric ratio of particle phase organic acid monomer units to particle phase organic ester units is approximately 30:70 by weight; and the monomeric ratio of aqueous phase organic acid monomer units to aqueous phase organic ester units is approximately 90:10 by weight.

6. The two-phase acidic aqueous composition of claim 1, wherein the particle phase organic ester monomer is substituted with a hydrophobic organic monomer substantially equivalent in functionality to the particle phase organic ester monomer.

7. The two-phase acidic aqueous composition of claim 1, wherein both particle phase and aqueous phase organic acid monomers are acrylic acid; and the particle phase organic ester monomers is butyl acrylate.

8. The two-phase acidic aqueous composition of claim 3, wherein
both particle phase and aqueous phase organic acid monomers are acrylic acid; and
both particle phase and aqueous phase organic ester monomers are butyl acrylate.

9. A two-phase acidic aqueous composition comprising a continuous aqueous phase and a discontinuous acidic particle phase;
the aqueous phase comprising a water soluble polymer, the polymer comprising recurring units of an organic acid monomer and an organic ester monomer, the aqueous phase organic acid monomer having at least one ethylenically unsaturated carbon-carbon bond, the aqueous phase organic acid monomer being capable of promoting the solubility of the aqueous phase organic ester monomer units being in a ratio effecting solubility of the aqueous phase polymer in water;
the acidic particle phase comprising a water insoluble polymer having recurring units of at least an organic acid monomer and an organic ester monomer, the organic acid monomer having at least one ethylenically unsaturated carbon-carbon bond and being capable of forming salts with alkali metals or with organic bases, the particle phase organic ester monomer having at least one ethylenically unsaturated carbon-carbon bond and capable of promoting the insolubility of the particle phase, the particle phase organic acid monomer and the particle phase organic ester monomer being in a ratio effecting insolubility of the particle phase polymer in the aqueous phase;
the particle phase organic acid monomer capable of interacting with the aqueous phase polymer at an interface between the particle phase and the aqueous phase such that the particle phase polymer is brought into intimate association with the continuous aqueous phase, whereby the particle phase is stably dispersed in the aqueous phase;
the aqueous phase organic ester monomer being the same as the particle phase organic ester monomer;
the total organic acid monomer units and total organic ester monomer units of the composition has a ratio of approximately 50:50 by weight;
the polymeric ratio of particle phase polymer to total polymer content is approximately 1:3 by weight, and the polymeric ratio of aqueous phase polymer to total polymer is approximately 2:3 by weight;
the monomeric ratio of particle phase organic acid monomer units to particle phase organic ester units is approximately 30:70 by weight; and
the monomeric ratio of aqueous phase organic acid monomer units to aqueous phase organic units is approximately 90:10 by weight.

10. The two-phase acidic aqueous composition of claim 9, wherein the aqueous phase organic acid monomer is the same as the particle phase organic acid monomer.

11. The two-phase acidic aqueous composition of claim 9, wherein the particle phase organic ester monomer is substituted with a hydrophobic organic monomer substantially equivalent in functionality to the particle phase organic ester monomer.

12. The two-phase acidic aqueous composition of claim 9, wherein
both particle phase and aqueous phase organic acid monomers are acrylic acid; and
the particle phase organic ester monomers is butyl acrylate, 13. The two-phase acidic aqueous composition of claim 9, wherein
both particle phase and aqueous phase organic acid monomers are acrylic acid; and
both particle phase and aqueous phase organic ester monomers are butyl acrylate.

* * * * *

UNITED STATES PATENT AND TRADEMARK OFFICE
CERTIFICATE OF CORRECTION

PATENT NO. : 5,427,899
DATED : June 27, 1995
INVENTOR(S) : D.W. AVISON, A.F. FEHERVARI, D.A. JOHNSON, and D.R. KORETSKY It is certified that error appears in the above-indentified patent and that said Letters Patent is hereby corrected as shown below:

| | |
|---|---|
| Col. 5, line 7, | delete "cud" and insert therefor --curl--. |
| Col. 5, lines 48-49, | delete "sulfonie" and insert therefor --sulfonic--. |
| Col. 5, lines 50-51, | delete "3-butenoie" and insert therefor --3-butenoic--. |
| Col. 5, line 54, | delete "alaninc" and insert therefor --alanine--. |
| Col. 6, line 26, | delete "tdacrylate" and insert therefor --triacrylate--. |
| Col. 6, line 34, | delete "Coy" and insert therefor --(by--. |
| Col. 6, line 42, | delete "reelamine" and insert therefor --melamine--. |
| Col. 7, line 4, | delete "cuff" and insert therefor --curl--. |
| Col. 7, line 8, | delete "cuff" and insert therefor --curl--. |
| Col. 7, line 19, | delete "Coy" (first incidence) and insert therefor --(by--. |
| Col. 7, line 19, | delete "Coy" (second incidence) and insert therefor --(by--. |
| Col. 7, line 24, | delete "Coy" and insert therefor --(by-- |
| Col. 8, line 23, | delete "partiallyneutralized" and insert therefor --partially-neutralized--. |
| Col. 11, line 55, | delete "carded" and insert therefor --carried--. |
| Col. 11, line 56, | delete "carded" and insert therefor --carried--. |
| Col. 14, line 56, | delete "154" and insert therefor --64--. |
| Col. 15, line 45, | delete "polymefic" and insert therefor --polymeric--. |
| Col. 16, line 17, | delete "beating" and insert therefor --bearing--. |
| Col. 19, line 40, | delete "toohomer" and insert therefor --monomer--. |
| Col. 19, line 49, | delete "two,phase" and insert therefor --two-phase--. |

UNITED STATES PATENT AND TRADEMARK OFFICE
CERTIFICATE OF CORRECTION

PATENT NO. : 5,427,899
DATED : June 27, 1995
INVENTOR(S) : D.W. AVISON, A.F. FEHERVARI, D.A. JOHNSON, and D.R. KORETSKY It is certified that error appears in the above-indentified patent and that said Letters Patent is hereby corrected as shown below:

| | |
|---|---|
| Col. 20, line 32, | delete "Goodrim" and insert thereof --Goodrite--. |
| Col. 21, line 4, | delete "alearating" and insert thereof --deaerating--. |
| Col. 22, line 50, | delete "al" and insert thereof --at--. |
| Col. 23, line 19, | delete "toohomer" and insert thereof --monomer--. |
| Col. 24, line 9, | delete "ultracentrifuge," and insert thereof --ultracentrifuge.--. |
| Col. 24, line 11, | delete "techniques," and insert thereof --techniques.--. |
| Col. 29, line 17, | between "phase" and "organic", insert --polymer in water, the aqueous phase organic acid monomer units and the aqueous phase--. |
| Col. 30, line 16, | between "organic" and "units", insert --ester--. |

Signed and Sealed this

Twenty-sixth Day of September, 1995

*Attest:*

BRUCE LEHMAN

*Attesting Officer*  Commissioner of Patents and Trademarks